United States Patent
Haner et al.

(10) Patent No.: US 8,224,960 B2
(45) Date of Patent: Jul. 17, 2012

(54) METHOD OF FLEXIBLE FREQUENCY ALLOCATION

(75) Inventors: Mark Haner, Westfield, NJ (US);
Danielle Hinton, Cambridge, MA (US);
Thierry Etienne Klein, Fanwood, NJ (US)

(73) Assignee: Alcatel Lucent, Paris (FR)

( * ) Notice: Subject to any disclaimer, the term of this patent is extended or adjusted under 35 U.S.C. 154(b) by 934 days.

(21) Appl. No.: 11/080,851

(22) Filed: Mar. 16, 2005

(65) Prior Publication Data

US 2006/0212588 A1 Sep. 21, 2006

(51) Int. Cl.
*G06F 15/173* (2006.01)
*G06F 15/16* (2006.01)

(52) U.S. Cl. .......... 709/226; 709/223; 709/229

(58) Field of Classification Search .......... 709/226, 709/223
See application file for complete search history.

(56) References Cited

U.S. PATENT DOCUMENTS

| | | | | |
|---|---|---|---|---|
| 5,280,630 A * | 1/1994 | Wang | | 455/452.2 |
| 5,909,594 A * | 6/1999 | Ross et al. | | 710/20 |
| 7,321,614 B2 * | 1/2008 | Jacobsen et al. | | 375/221 |
| 2002/0075844 A1 * | 6/2002 | Hagen | | 370/351 |
| 2003/0236854 A1 * | 12/2003 | Rom et al. | | 709/217 |
| 2005/0063336 A1 * | 3/2005 | Kim et al. | | 370/329 |
| 2005/0073955 A1 * | 4/2005 | MacLean et al. | | 370/235 |
| 2009/0052464 A1 * | 2/2009 | Gardner et al. | | 370/436 |

OTHER PUBLICATIONS

"Dynamic Spectrum Allocation in Composite Reconfigurable Wireless Networks" Leaves, P. Moessner, K. Tafazolli, R. Grandblaise, D. Bourse, D. Tonjes, R Breveglieri, M. May 2004 IEEE Communications Magazine. vol. 42, Issue: 5 pp. 72-81.*
Kumaran, Krishnan et al., "*Uplink Scheduling in CDMA Packet-Data Systems*", IEEE, pp. 292-300, 2003.
Borst, Sem, "*User-Level Performance of Channel-Aware Scheduling Algorithms in Wireless Data Networks*", IEEE, pp. 321-331, 2003.
Joshi, Niranjan et al., "*Downlink Scheduling in CDMA Data Networks*", MOBICOM, Boston, MA USA, pp. 179-190, 2000.

* cited by examiner

*Primary Examiner* — Jeffrey Pwu
*Assistant Examiner* — Noel Beharry
(74) *Attorney, Agent, or Firm* — Harness, Dickey & Pierce, P.L.C.

(57) ABSTRACT

In the method of flexible frequency allocation, at least a portion of a frequency spectrum for a lower priority class of applications is allocated to a higher priority class of applications if overload of frequency spectrum for the higher priority class of applications is detected, an emergency situation occurs, etc.

22 Claims, 2 Drawing Sheets

METHOD OF FLEXIBLE FREQUENCY ALLOCATION

BACKGROUND OF THE INVENTION

The present invention relates to the field of wireless communication.

Commercial wireless network providers recognize that different subscriber may desire different levels of service, and may even desire different levels of service for different applications (e.g., voice, streaming video, email, web-browsing, etc.). For example, a subscriber may be willing to pay a higher subscription fee for a higher level of data throughput while surfing the Internet or downloading email. As another example, a subscriber may be willing to pay for a higher email download speed, but does not want to pay extra for higher internet web-page download speeds. To entice subscribers to pay higher prices for higher levels or quality of service, network providers need to be able to guarantee those higher levels of service.

Similarly, in the government sector, a government owned wireless network may be provided. The government network may be shared by emergency services such as police, fire and rescue as well as civil and municipal services such as schools, libraries, traffic information providers, home inspectors, non-emergency police and fire communication, etc. As will be appreciated, service and/or higher quality of service needs to be guaranteed for emergency services than may be needed for civil and municipal services.

SUMMARY OF THE INVENTION

Recognizing that a limited amount of frequency spectrum is available for wireless communication, the present invention provides a method for flexibly allocating the frequency spectrum.

For example, recognizing that a commercial network provider more highly values subscribers paying higher amounts because of promised higher quality of service than lower paying customers, the commercial network provider may be willing to re-allocate more frequency spectrum to the higher paying customers at the expense of frequency spectrum for lower paying customers.

Similarly, recognizing that emergency services take priority over civil and municipal services, the government wireless network will, when necessary, want to re-allocate more frequency spectrum to emergency services at the expense of frequency spectrum for civil and municipal services.

In accordance with one embodiment of the present invention, the applications of a subscriber are assigned a priority. For example, a subscriber to a commercial wireless network may subscribe to different qualities of service for different applications. For example, the commercial service provider may offer different prices for different ranges of quality of service for each application. A subscriber subscribes to a particular range for each application as the quality of service for that application. Based on the quality of service subscribed to for each application, the subscriber is assigned a priority with respect to that application. Applications of similar priority may then be grouped into classes.

Similarly, in accordance with another embodiment of the present invention, the priority class assigned to an application and/or subscriber (also referred to as a user) may be dependent on the service with which the application and/or user is associated. For example, applications and/or users associated with emergency services are assigned a higher priority class than applications and/or users associated with civil and municipal services.

In one embodiment, at least a portion of the frequency spectrum for a lower priority class of applications is allocated to a higher priority class of applications if a need for more spectrum to handle the higher priority class of applications is detected.

For example, the need for more frequency spectrum may be detected if overload of the frequency spectrum for the higher priority class of applications is detected. As another example, the need for more frequency spectrum may be detected if an emergency occurs. These two examples are by no means an exhaustive list of possible examples.

The portion of the frequency spectrum of the lower priority class of applications and the portion of the frequency spectrum of the higher priority class of applications may be one of a channel, a carrier, and a portion of one of a channel and a carrier.

The method may further include allocating applications using the portion of the frequency spectrum for the lower priority class of applications being re-allocated to the higher priority class of applications to other portions of the frequency spectrum for the lower priority class of applications. Additionally or alternatively, the method may include dropping applications using the portion of the frequency spectrum for the lower priority class of applications being re-allocated to the frequency spectrum for the higher priority class of applications.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
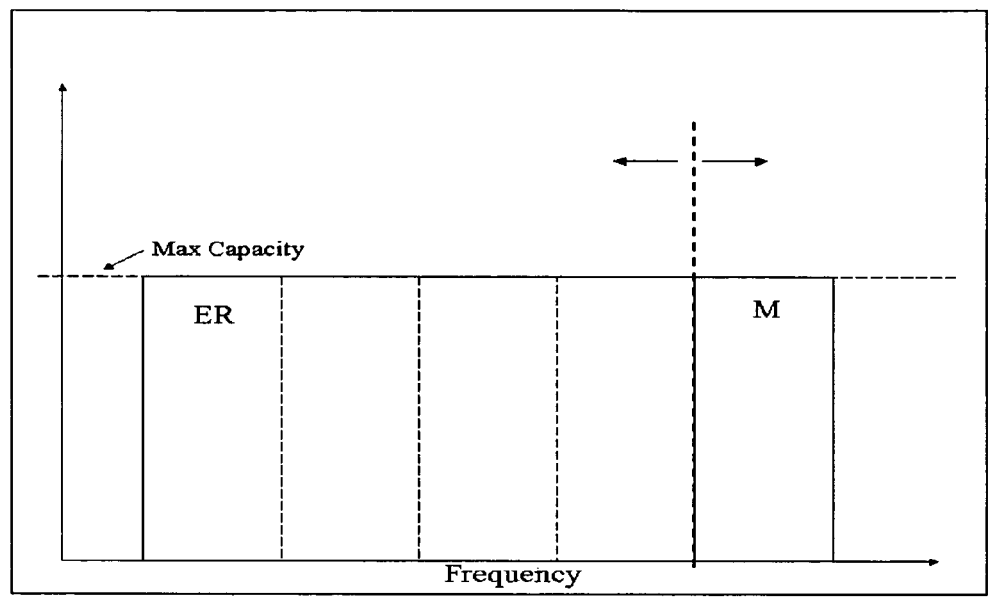
FIG. 1 illustrates an example of frequency portioning between two different levels of service.

A commercial wireless network service provider may provide different qualities of service on a per subscriber (also referred to as a user) basis, on a per application basis, or a combination of both. Examples of applications are voice communication, video streaming, web-browsing, email (uploading or sending, and downloading or receiving), etc. Different quality of service parameters indicate the quality of service being provided for a given application. Examples of quality of service parameters include frame error rate, bit error rate, minimum throughput, delay of individual received frames, delay jitter between consecutive received frames, packet error rates, rise over thermal, etc. all of which are well-known parameters in the wireless communication industry. As will be appreciated, this list is by no means exhaustive.

The commercial wireless network provider may provide different pricing plans whereby the subscriber pays an incrementally higher price for higher levels of service for each application. For example, the network service provider may offer three different levels of throughput in association with video streaming. As an illustrative example, the cheapest level may provide throughputs in the range of 9.6 kbps to 38.4 kbps, the next more costly level may provide throughputs in the range of 38.4 kbps to 76.8 kbps, and the most costly level may provide throughputs in the range of 76.8 kbps to 153.6 kbps. Additionally, or alternatively, instead of providing incremental pricing per application, the wireless network service provider may provide differently priced packages, wherein each package is associated with particular quality of service guarantees for a variety of applications. Namely, high priced packages will offer higher quality of service guarantees (e.g., a higher range of guaranteed throughput) than lower priced packages.

Depending on the subscribed to quality of service per application, the application is assigned to a priority class. For example, an application having a higher throughput quality of service guarantee may be assigned to a higher priority class of applications than an application having a lower throughput quality of service guarantee. As will be appreciated, two applications run by the same subscriber may, therefore, belong to different priority classes; and different subscribers running the same application may have their respective applications belonging to a different priority class. Likewise, different subscribers running the same or different applications may have those applications assigned to the same priority class. It should be understood, that the applications or users in a priority class need not have the same priority. Examples are discussed below where applications or users in the same priority class may have different priorities.

As a further alternative, division of applications into different priority classes may be made on a subscriber basis instead of an application by application basis. For example, a subscriber subscribing to a higher priced package may be assigned to higher priority class, or have his applications assigned to a higher priority class, than a subscriber subscribing to a lower priced package.

Dividing applications and/or users into priority classes also applies to government wireless networks. For example, the applications of emergency service users (e.g., police, fire, rescue, etc.) may be assigned to a high priority class than applications of civil and municipal service users (e.g., library, school, building inspectors, etc.). It will be appreciated that, in a government wireless network, applications or users are assigned to different priority classes not based on having paid a higher price for a higher quality of service. Instead, applications and/or users are assigned different priority classes based on the perceived importance of the function they are performing. Namely, firemen responding to a house fire are deemed to have a higher priority than a librarian communicating with a local school. Similarly, a fireman responding to a house fire may be deemed to have a higher priority than firemen, in a non-emergency situation.

As a few more examples, consider that video-streaming applications may be deemed less necessary to responding to a fire than the voice communication applications. The opposite may be true in other situations. Also, as has been mentioned, priority may be based on the user. For example, the fire chief coordinating the response to a fire may have his applications or a chosen set of applications assigned to a higher priority class than the other firemen responding to the fire. Alternately, the fire chief may be in the same priority class as the other EMS services, but have a higher priority within that class.

As will be appreciated from the above description, assignment to a priority class may be predetermined or preset. Here, the priorities assigned may be stored and managed as part of a subscriber's profile and sent to a base station or mobile switching center serving the subscriber. Alternatively, priority class assignments may be flexibly changed. For example, flexible change may be performed by a system operator at the mobile switching center such as in the case of the fire emergency example above.

Regardless of the method of assignment, or the flexibility with which that assignment may be changed, the method of allocating frequency spectrum based on that assignment is applicable. For ease of description, the method of allocating frequency spectrum will be described for the simple case of two priority classes.

Figure 2:
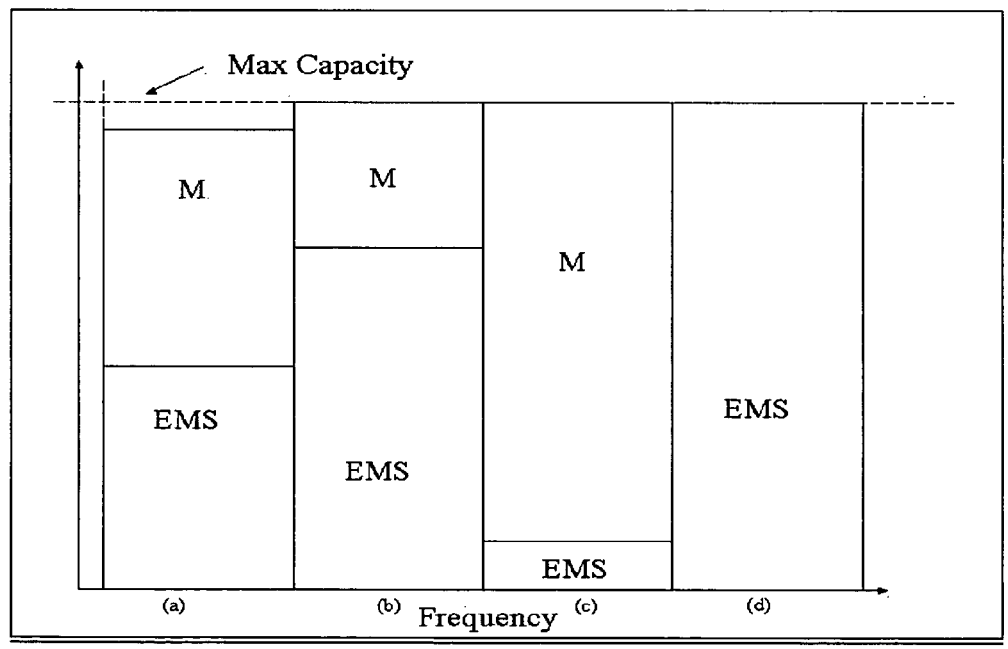
FIG. 2 illustrates another example of frequency portioning between two different levels of service.

For example, assume the case where the higher priority class includes the applications of emergency service users and the lower priority calls includes the applications of civil and municipal service users. Further assume, as shown in FIG. 1, that the frequency spectrum has been partitioned into several channels or carriers, a first subset of the channels has been allotted to emergency services and a second subset of the channels has been allotted to civil and municipal services. For the sake of ease of explanation only, allotment and flexible allocation will be described as taking place on an entire channel or carrier basis; however, it will be understood that the channels or carriers may be divided and partially allotted and allocated. FIG. 2 illustrates an example of channels divided and partially allotted. For example, a carrier may be partially allotted by assigning a subset of OFDM tones, channelization codes, slots or portions of a slot, CDMA codes, etc.

Figure 3:
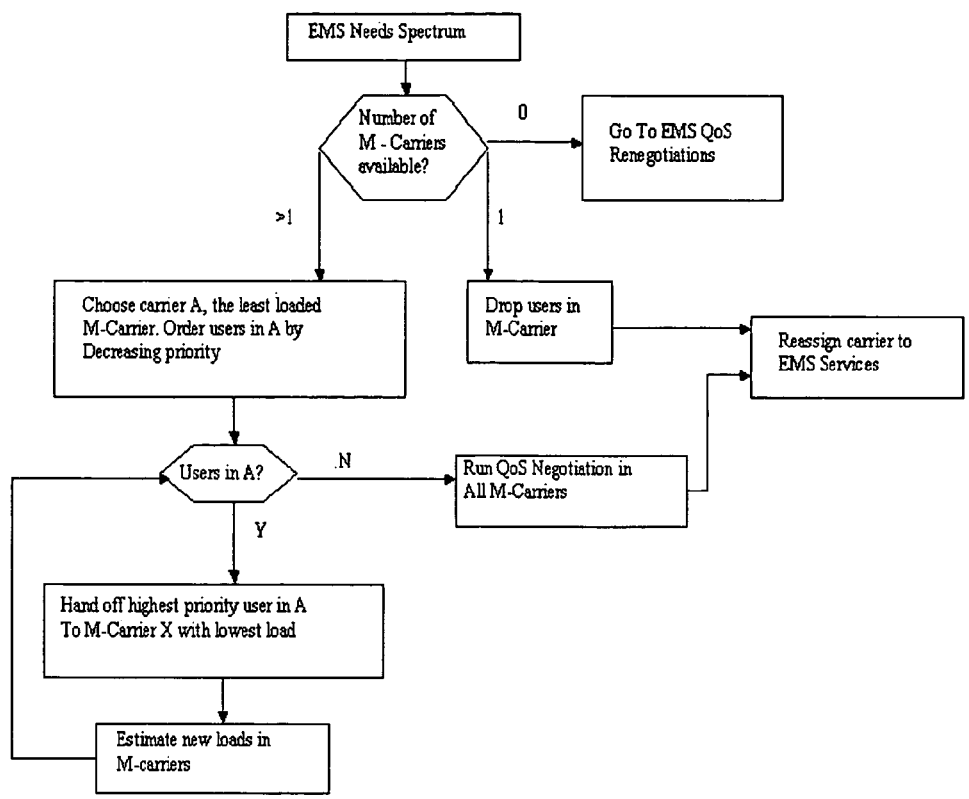
FIG. 3 illustrates a flow chart of an embodiment of the method for flexibly allocating frequency spectrum according to the present invention.

As will be appreciated, as the need of emergency services increases such as during an emergency situation, channels previously allocated to civil and municipal services may need to be handed over to emergency services. FIG. 3 illustrates a flow chart of an embodiment for allocating carriers previously allotted to civil and municipal service (M services in FIG. 3) to emergency services (EMS services in FIG. 3). It will be appreciated that the method of which FIG. 3 is an example, may be run at a network control node such as a mobile switching center (MSC), a radio network controller (RNC), etc.

As shown, the embodiment of FIG. 3 is triggered in step S10 if it is determined that the EMS services need more spectrum. In one embodiment, this determination may be made by an a priori rule based on the level of an emergency situation. In another embodiment, if overload of the spectrum allotted to EMS services is detected, then it is determined that the EMS services need more spectrum. Overload may be detected based on the performance metrics for quality of service parameters. Generally speaking quality of service (QoS) parameters may be thought of in several ways:

Preferred QoS, which is the ideal level of service for a given application.

Required QoS, which is the minimum level of service required for the application to function properly.

Target QoS, which is the level of service that the resource allocation algorithms aims to achieve. For example, the target QoS may be set to the required QoS or to some level between the required QoS and the preferred QoS.

Accordingly, overload may be detected if the achieved QoS as indicated by a performance metric falls below a target QoS. The overall wireless system is deemed to be in overload if the performance metric for at least one of the applications/users in the system is below the corresponding QoS target. Of course, additional factors such as available power, number of codes and channel elements used, etc. may also be included in this determination.

In one embodiment, a normalized performance metric $f_{i,j}$ for each QoS parameter j of an application i, that captures the ratio of the achieved quality of service (QoS) performance with respect to the target QoS, is determined. The application i may have more than one quality of service parameter. For example, assume an application has the QoS parameters of throughput, delay and packet loss. Then, the application i would have three normalized performance metrics $f_{i,1}$, $f_{i,2}$, and $f_{i,3}$ for throughput, delay and packet loss, respectively, as shown below:

$$f_{i,1} = \frac{T_{min}}{T_i} \text{ (throughput)}$$

$$f_{i,2} = \frac{D_i}{D_{max}} \text{ (delay)}$$

$$f_{i,3} = \frac{P_i}{P_{max}} \text{ (packet loss probability)}$$

where $T_i$ is the achieved throughput; $T_{min}$ is the minimum throughput target; $D_i$ and $P_i$ are, respectively, the achieved packet delay (e.g., the maximum measured packet delay, the average packet delay or a percentile of the measured packet delays) and packet loss probability; $D_{max}$ and $P_{max}$ are, respectively, the maximum packet delay and packet loss probability. It will be appreciated that these QoS parameters are merely examples, and that an application may have different QoS parameters. Also, an application may have more or less than three QoS parameters.

An advantage of the normalized performance metric definition is that it leads to a dimensionless quantity to capture the QoS performance and allows comparison to QoS targets specified in terms of throughput, delay and packet loss. Alternative definitions would include the difference between the achieved performance and the target QoS performance, relative to the target performance. Note that if an application has multiple QoS targets, different performance metrics may be defined for the same application as in the example above. It is evident from the definition of $f_{i,j}$ that the QoS target performance for application i is achieved if $f_{i,j} \leq 1$. Namely, system overload exists for $f_{i,j} > 1$. For additional robustness to small time scale performance fluctuations and measurements, a margin E>0 may be included such that system overload is detected for $f_i$>1-E.

Returning to FIG. 3, if system overload is detected, then in step S12 the number of carriers allotted to M services is determined. If no carriers are allotted to M services, then there are no carriers of M services that can be allocated to EMS services, and processing ends.

If only one carrier is allotted to M services, then in step S14 the civil and municipal users of that carrier are dropped and in step S16 the carrier is allocated to the EMS services spectrum.

If more than one carrier is allotted to M services, then in step S18, it is determined if any of the M service carriers (or M carriers) are not loaded. The network control node will know if any users are on a carrier. If one or more unloaded M carriers exists, then in step S16 one or more of the unloaded carriers may be reassigned to the EMS services spectrum.

If, in step S18, there is no unloaded M carrier, then in step S20 the load on each carrier allotted to M services is determined, and the least loaded carrier allotted to M services is determined. The performance metric $f_{i,j}$ discussed above may be used to determine the load of each carrier allotted to M services. In one embodiment the maximum $f_{i,j}$ of the applications handled by a carrier is determined as the $f_{i,j}$ indicative of the load on that carrier; hereinafter referred to as the load $f_{i,j}$ or the carrier performance metric. In an alternative embodiment, the performance metric $f_{i,j}$ for the applications handled by a carrier are averaged to obtain the carrier performance metric. As will be appreciated, when portions of a carrier, instead of an entire carrier, are being reallocated, a performance metric for each portion may be obtained as described above and used as described below.

Having obtained the carrier performance metric for each carrier allotted to the M services, the carrier having the lowest carrier performance metric value (e.g., best performance) is determined as the least loaded carrier.

Then in step S22, one of the users in the least loaded M carrier is selected and handed off to the second-to-least loaded carrier allotted to the M services. The user selected may be the highest priority user out of the users handled by the least loaded carrier. As discussed above, while the users are classified into one of the two priority classes based on their service association (EMS services or M services), the users and/or the applications of those users within a class of services may have different priority. Also, as described above, a service priority class may include one or more priority subclasses differing in priority.

Selection of the user to handoff need not be limited to priority. Instead, many various methods of selection may be used. For example, the user with the longest active traffic channel may be selected, the user with the strongest signal may be selected, the user with the smallest performance metric may be selected, etc.

After the user is handed off, it is determined in step S24 if any more users exist for the least loaded M carrier. If not, processing proceeds to step S16. However, if more users do exist, then in step S26, the load on the M services carriers other than the least loaded carrier is determined such as was described with respect to step S20. Processing then returns to step S22. By recalculating the load on the M services carriers, the users in the least loaded carrier will be handed off to the most current second-to-least loaded carrier. Namely, the second-to-least loaded carrier may change after each handoff, and therefore, the users in the least loaded carrier may not necessarily be handed off to the same carrier.

It will also be appreciated that handoff may not be possible because of overload on the other M services carriers. In this event, as an example, the remaining users on the least loaded M services carrier are dropped.

A similar procedure is devised to re-allocate channels to the M-services after the needs of EMS-services have decreased. Indeed, if the emergency has subsided and a channel assigned to EMS-services does not have any EMS users assigned to it for a period of time exceeding a threshold, this channel may be moved back to the pool of channels available for M-services. In addition, if the loading of all the EMS channels has dropped below a threshold value (indicating that the resource allocation algorithm can satisfy the QoS requirements with ease and therefore that additional resources are available in each channel), the EMS-services spread across different channels may be re-combined in a smaller subset of channels. The channels that are freed up in this fashion are then reclaimed by the M-services.

The outlined frequency-partitioning scheme is particularly effective in a cell where both the M-services and the public safety personnel have access to the entire range of channels throughout the cell. This hard channelization with a flexible boundary between the M-services and the EMS-services simplifies the spectrum management and essentially reduces the system into two nearly independent systems that can be managed and operated independently. This may be an attractive feature since the objectives of each of the sub-systems may be different and potentially conflicting. The gains in terms of simplicity of management should be readily apparent.

Also, in the event of an extra-large, 9/11-scale emergency, it is in the best interest of the nation to make use of all available wireless spectrum to support the emergency response network. As such, the method of the present invention may be used to incrementally claim portions of the commercial spectrum used by commercial networks.

The exemplary embodiments of the present invention being thus described, it will be obvious that the same may be varied in many ways. Such variations are not to be regarded as a departure from the invention, and all such modifications as would be obvious to one skilled in the art are intended to be included within the present invention.

We claim:

1. A method of flexible frequency allocation, comprising:
   determining a performance metric for each portion of a network service provider frequency spectrum initially allocated to a lower priority class of applications, the portions of the network service provider frequency spectrum initially allocated to the lower priority class of applications being partitioned from portions of the network service provider frequency spectrum initially allocated to a higher priority class of applications, each application being run by at least one subscriber, wherein the determined performance metric is a performance metric for one of a channel and/or at least one carrier for the portions of the network service provider frequency spectrum initially allocated to the lower priority class of applications;
   determining a least loaded one of the portions of the network service provider frequency spectrum allocated to the lower priority class of applications based on the performance metrics, the least loaded portion being the portion of the network service provider frequency spectrum initially allocated to the lower priority class of applications having an associated performance metric indicating best performance out of each portion of the network service provider frequency spectrum initially allocated to the lower priority class of applications; and
   reallocating the least loaded portion of the network service provider frequency spectrum from the lower priority class of applications to a higher priority class of applications if a need for more network service provider frequency spectrum to handle the higher priority class of applications is detected.

2. The method of claim 1, wherein the need for more network service provider frequency spectrum is detected if overload of the network service provider frequency spectrum for the higher priority class of applications is detected.

3. The method of claim 2, further comprising:
   detecting overload of the network service provider frequency spectrum for the higher priority class of applications based on at least one quality of service parameter.

4. The method of claim 3, wherein the detecting step detects overload of the network service provider frequency spectrum for the higher priority class of applications based on at least one quality of service parameter and an associated quality of service threshold.

5. The method of claim 3, wherein the quality of service parameter is at least one of frame error rate, bit error rate, minimum throughput, delay of individual received frames, delay jitter between consecutive received frames, packet error rates, and rise over thermal.

6. The method of claim 1, wherein:
   the determining a performance metric step includes determining the performance metric for each portion of the network service provider frequency spectrum initially allocated to the lower priority class of applications.

7. The method of claim 6, wherein, for each portion, the determining a performance metric for each portion step comprises:
   determining a performance metric for each application using the portion of the network service provider frequency spectrum initially allocated to the lower priority class of applications; and
   determining the performance metric for the portion of the network service provider frequency spectrum initially allocated to the lower priority class of applications based on the determined performance metrics for the applications using the portion of the network service provider frequency spectrum initially allocated to the lower priority class of applications.

8. The method of claim 7, wherein the performance metric for an application includes at least one of frame error rate, bit error rate, throughput, delay of individual received frames, packet error rate, and rise over thermal.

9. The method of claim 7, wherein the determining a performance metric for each application step determines each performance metric based on at least one actual performance measurement and a poor performance bound associated with the actual performance measurement.

10. The method of claim 9, wherein the determining a performance metric for each application step determines each performance metric for an application such that a lower value of the performance metric indicates better performance.

11. The method of claim 10, wherein a largest one of the performance metrics for the applications using the portion of the network service provider frequency spectrum initially allocated to the lower priority class of applications is determined as the performance metric for the portion of the network service provider frequency spectrum initially allocated to the lower priority class of applications.

12. The method of claim 11, wherein the portion of the network service provider frequency spectrum initially allocated to the lower priority class of applications having a lowest performance metric is determined as the least loaded portion of the network service provider frequency spectrum initially allocated to the lower priority class of applications.

13. The method of claim 10, wherein an average of the performance metrics for the applications using the portion of the network service provider frequency spectrum initially allocated to the lower priority class of applications is determined as the performance metric for the portion of the network service provider frequency spectrum initially allocated to the lower priority class of applications.

14. The method of claim 13, wherein the portion of the network service provider frequency spectrum initially allocated to the lower priority class of applications having a lowest performance metric is determined as the least loaded portion of the network service provider frequency spectrum initially allocated to the lower priority class of applications.

15. The method of claim 1, wherein the reallocating step is repeated until overload of the network service provider frequency spectrum for the higher priority class of applications is no longer detected.

16. The method of claim 1, further comprising:
   reallocating applications using the portion of the network service provider frequency spectrum initially allocated to the lower priority class of applications being reallocated to the higher priority class of applications to other portions of the network service provider frequency spectrum initially allocated to the lower priority class of applications.

17. The method of claim 1, further comprising:
dropping applications using the portion of the network service provider frequency spectrum initially allocated to the lower priority class of applications being reallocated to the network service provider frequency spectrum for the higher priority class of applications.

18. The method of claim 1, wherein the applications are grouped into priority class by at least one of service association and user association.

19. The method of claim 18, wherein the higher priority class of applications is associated with emergency response services and the lower priority class of applications is associated with municipal services.

20. The method of claim 1, wherein the need for more network service provider frequency spectrum is detected if an emergency occurs.

21. The method of claim 1, further comprising:
reallocating at least a portion of the network service provider frequency spectrum for the higher priority class of applications back to the lower priority class of applications if the need for more network service provider frequency spectrum to handle the higher priority class of applications no longer exists.

22. The method of claim 21, further comprising:
detecting that the need for more network service provider frequency spectrum to handle the higher priority class of applications no longer exists if loading of the network service provider frequency spectrum for the higher priority class of applications falls below a threshold.

* * * * *